US007047309B2

(12) United States Patent
Baumann et al.

(10) Patent No.: US 7,047,309 B2
(45) Date of Patent: *May 16, 2006

(54) LOAD BALANCING AND DYNAMIC CONTROL OF MULTIPLE DATA STREAMS IN A NETWORK

(75) Inventors: Gerald Walter Baumann, Surprise, AZ (US); Robert Franklin Pryor, Lynn Haven, FL (US); Marc Steinbrecher, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 921 days.

This patent is subject to a terminal disclaimer.

(21) Appl. No.: 10/043,053

(22) Filed: Jan. 8, 2002

(65) Prior Publication Data

US 2002/0099844 A1    Jul. 25, 2002

Related U.S. Application Data

(63) Continuation-in-part of application No. 09/644,494, filed on Aug. 23, 2000.

(51) Int. Cl.
*G06F 15/16* (2006.01)

(52) U.S. Cl. .................. 709/232; 709/231; 709/233; 370/395.41; 379/114.07; 725/96

(58) Field of Classification Search ........ 709/231–233, 709/226; 370/395.41, 5; 725/96; 379/114.07
See application file for complete search history.

(56) References Cited

U.S. PATENT DOCUMENTS 5,559,798 A     9/1996  Clarkson et al.
5,706,281 A     1/1998  Hashimoto
5,805,804 A     9/1998  Laursen et al.

(Continued)

FOREIGN PATENT DOCUMENTS

EP          0924902 A2      6/1999

(Continued)

OTHER PUBLICATIONS

IBM Technical Disclosure Bulletin, Dynamic Computation of TCP Maximum Window size for Directly Connected Hosts, vol. 37, No. 04A, Apr. 1994, pp. 601-607.

(Continued)

*Primary Examiner*—Saleh Najjar
*Assistant Examiner*—Liang-che Wang
(74) *Attorney, Agent, or Firm*—John R. Pivnichny; Dillon & Yudell LLP

(57) ABSTRACT

Available bandwidth utilization during transfer of large files over a TCP/IP network is improved by load balancing data streams and dynamically controlling the number of data streams utilized. A determination is made of the optimum number of data streams for a particular data file transfer in the early stage of transmission. An initial number of data streams, which is one unless otherwise specified or determined, is used to transmit one or more file segments, each on a different data stream, immediately followed by a second initial number of data streams, which is at least two greater than the initial number of data streams, is used to transmit another portion of the large data file. During each transmission, individual and aggregate transmission bandwidths are determined. Responsive to a determination that the latest aggregate transmission bandwidth is significantly different from the previous aggregate transmission bandwidth, the number of data streams is modified.

27 Claims, 5 Drawing Sheets

U.S. PATENT DOCUMENTS

| | | | |
|---|---|---|---|
| 5,859,853 | A | 1/1999 | Carlson |
| 6,023,475 | A | 2/2000 | Tanaka et al. |
| 6,061,733 | A | 5/2000 | Bodin et al. |
| 6,219,669 | B1 | 4/2001 | Haff et al. |
| 6,289,012 | B1 | 9/2001 | Harrington et al. |
| 6,339,785 | B1 | 1/2002 | Feigenbaum |
| 6,363,357 | B1 * | 3/2002 | Rosenberg et al. ............ 705/26 |
| 6,430,577 | B1 | 8/2002 | Hart |
| 6,606,646 | B1 | 8/2003 | Feigenbaum |
| 6,854,009 | B1 * | 2/2005 | Hughes ...................... 709/220 |

FOREIGN PATENT DOCUMENTS

| | | |
|---|---|---|
| WO | WO 97/44942 | 11/1997 |

OTHER PUBLICATIONS

Enabling High Performance Data Transfers on Hosts: (Notes for Users and System Administrators), Feb. 17, 2000, http://www.psc.edu/networking/perf_tune.html, pp. 1-18.

U.S. Appl. No. 09/644,494, Internet Backbone Bandwidth Enhancement, Gerald W. Baumann, et al., Filed Aug. 23, 2000, pp. 1-39, with six (6) pages of drawings. (Parent Application of present Continuing Application).

Liu, Y.; Gong, W.; Shenoy, P.; "On the impact of concurrrent downloads," Simulation Conference, 2001; Proceedings of the Winter, vol. 2; Dec. 9-12, pp. 1300-1305.

* cited by examiner

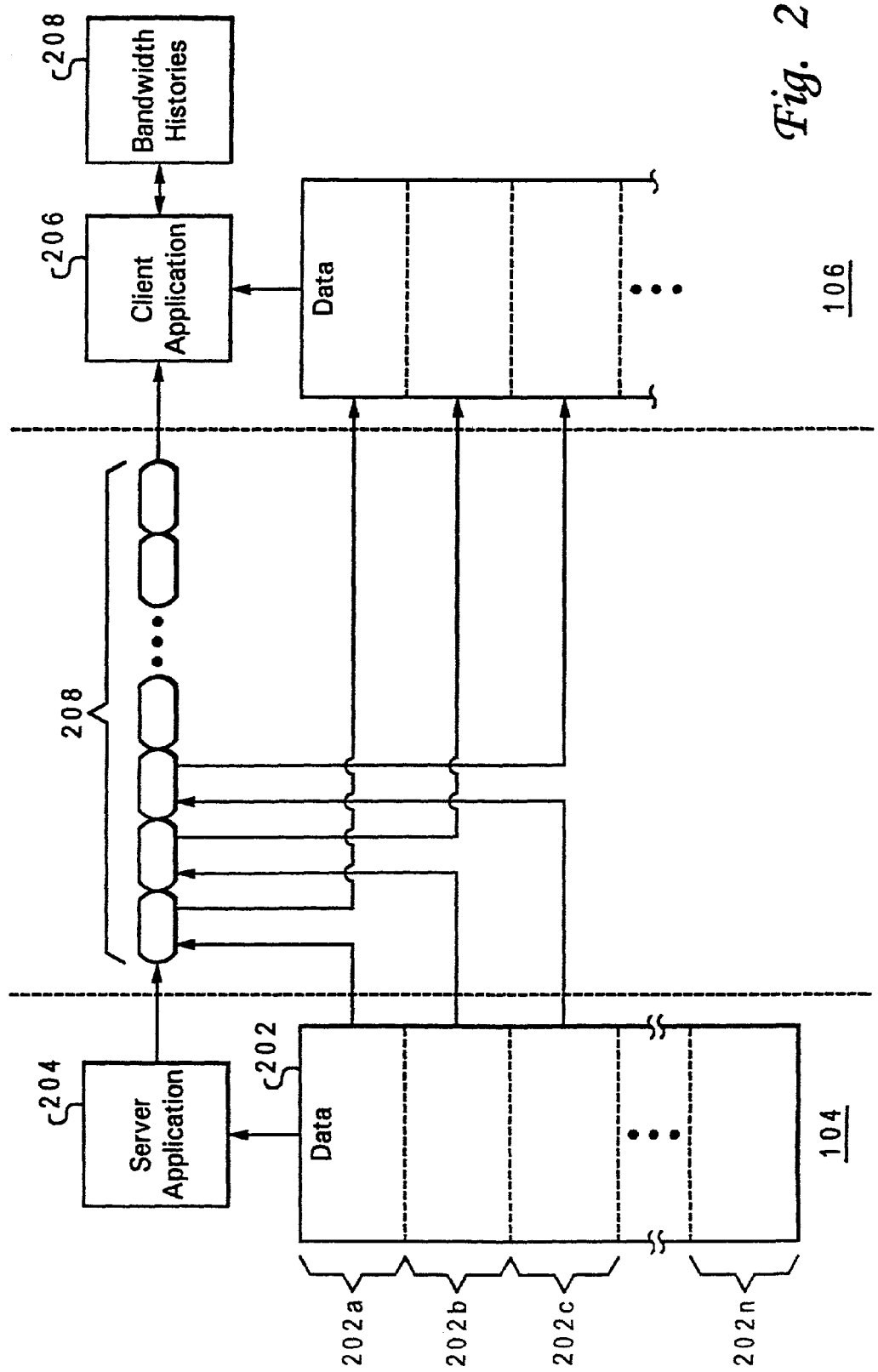

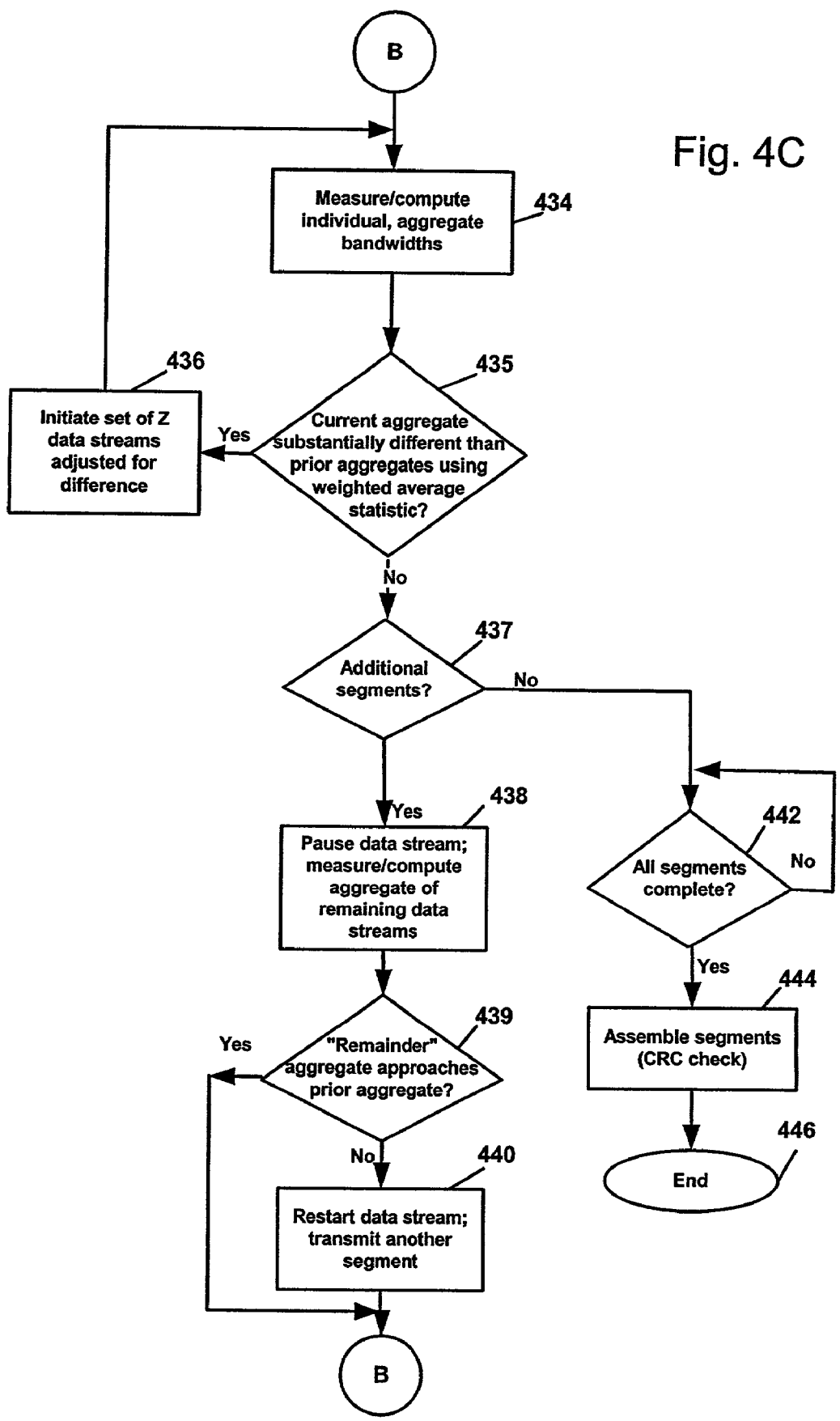

LOAD BALANCING AND DYNAMIC CONTROL OF MULTIPLE DATA STREAMS IN A NETWORK

RELATED APPLICATIONS

This is a continuation-in-part of U.S. patent application Ser. No. 09/644,494, filed Aug. 23, 2000, assigned to the same assignee thereof.

BACKGROUND OF THE INVENTION

1. Technical Field

The present invention relates generally to data transfers in data processing system networks and in particular to transfer of large data blocks over the Internet or similar networks. Still more particularly, the present invention relates to load balancing and dynamic control of parallel data transmission streams to improve bandwidth for transfers of large data bundles over a network such as the Internet.

2. Description of the Related Art

The Internet has become an important conduit for transmission and distribution of data (text, coded, image, video, audio, or mixed) and software. Users connect to the backbone with broadly divergent levels of performance, ranging from 14.4 Kb/s to more than 45 Mb/s. Moreover, Transmission Control Protocol/Internet Protocol (TCP/IP) has become a widely implemented standard communication protocol, enabling broad heterogeneity between clients, servers, and the communications systems coupling them.

The differences in equipment performance, user skill, and error rate (packet loss) necessitates monitoring of user data receipt and user response under the TCP/IP system. To accomplish this, TCP/IP establishes a "sliding window" which limits the maximum number of sequential bytes between the byte most recently sent from the server to the earliest byte for which a receipt acknowledgment has not yet been received from the client. A variety of algorithms automatically re-send packets and slowly restart data transmission when the sliding window limit is exceeded. Thus, if the link between the server and client is shut down in the middle of transmission of a data collection, the server will stop sending packets within one sliding window of the last packet acknowledged by the client.

This use of a sliding window inherently limits the bandwidth B of a data transfer through the backbone to the ratio:

$$B = \frac{\text{sliding window}}{\text{round trip time}}$$

where the sliding window is a number of bytes. The round trip time (which may be approximated by ping time) is the time for a packet to leave the sender, pass through the routers and firewalls for the sending enterprise's server, hop through the Internet backbone from one backbone operator to another, pass through the client's routers, and be received by the client, plus the time required for an acknowledgment to likewise pass between the client and server in the opposite direction.

One obvious component of round trip time is propagation time. Even with fiber optic cables, if the server and client are separated by 10,000 kilometers, the light pulses require 100 msec for the round trip. Another component to round trip time is transmission delays. If there are ten hops in each direction with 5 msec lost in transmission delay for each hop, another 100 msec is added to the round trip time. With additional delays from the response time at the client and any bandwidth limitations in the client and server infrastructure, a total round trip time on the order of 200 msec may be expected in such situations.

Ping times within the United States and Canada are typically on the order of 100 msec; ping times between the United States and western Europe or Japan are typically on the order of 200 msec. Typical default sliding windows in products such as IBM's AIX 4.3 (Berkeley configuration) are 16 KBytes. As a result, the maximum bandwidth achievable for such products is about 160 KB/sec (i.e., 1.28 Mb/sec) within the United States and about half that between the United States and western Europe or Japan. Even a single T1 connection provides greater bandwidth, and many enterprises have far more than single T1 line capacity.

One approach to improving bandwidth utilization for large data transfers is to set the sliding window to extremely high values. However, the sliding window must be reset in both the server and client systems, which is possible for special situations (e.g., particular, controlled transfers between commonly owned or controlled systems) but not for the heterogenous Internet environment, where sliding windows within a large number of client systems cannot be automatically set to match the sliding window within the server system. In distributing software to thousands of customers, for example, a wide variety of operating systems is encountered, each with a preset sliding window not typically adjustable by normal users Most users are unfamiliar with the controls enabling sliding windows to be reset to higher values. Moreover, increasing the sliding window to levels at which it no longer becomes the bandwidth-limiting factor would cause other serious problems to occur in servers and networks.

Systems designed to move large amounts of data quickly over the Internet backbone typically use multiple TCP/IP data streams (herein also "threads") to improve the aggregate bandwidth at multiples of the single data stream (herein also "thread") bandwidth limits. When the infrastructure has adequate bandwidth to benefit from multiple threads, the aggregate bandwidth of the system suffers when fewer or more threads than the optimum number of threads to maximize bandwidth are used. Consequently, it would be desirable to determine the optimum thread count for each data file transfer. Further, since the optimum number of data streams depends on the resource availability in the client infrastructure, the backbone, and the server infrastructure, this determination of optimum data streams will change along with the resource availability. Moreover, current network systems do not enable intelligent control by the server to better optimize and increase bandwidth. To deliver maximum customer bandwidth, consistent with server capacity, it would be desirable if the data streams could be dynamically adjusted to the network performance.

SUMMARY OF THE INVENTION

It is therefore one object of the present invention increase data transfer rates in data processing system networks.

It is another object of the present invention to increase data transfer rates of large data blocks over the Internet or similar networks.

It is yet another object of the present invention to provide load balancing and dynamic control of parallel data transmission streams using both client and server to improve bandwidth for transfers of large data bundles over a network such as the Internet.

The foregoing objects are achieved as is now described. Available bandwidth utilization during transfer of large files over a TCP/IP network is improved by load balancing data streams at the initiation of a large data transfer and dynamically controlling the number of data streams utilized as conditions within the infrastructure environment change. Software code running in both the client and the server optimizes the number of data streams utilized for each data transfer. A determination is made of the optimum number of data streams for a particular data file transfer in the early stage of transmission. Thereafter, performance is tracked and the number of data streams is dynamically modified as conditions in the infrastructure dictate.

According to the preferred embodiment, a method of transmitting data is provided. Transfer of a large data file containing a plurality of segments is initiated over a network by transmitting one or more segments of the plurality of segments utilizing a first set of M concurrent data streams, wherein M is one or more, followed by transmitting one or more segments of the plurality of segments utilizing a second set of N concurrent data streams, wherein N>M+1. The process continues with the steps of: during transmission utilizing the first set of M concurrent data streams, determining individual transmission bandwidths for each concurrent data stream of the first set of M concurrent data streams and a first aggregate transmission bandwidth for the first set of M concurrent data streams; during transmission utilizing the second set of N concurrent data streams, determining individual transmission bandwidths for each concurrent data stream of the second set of N concurrent data streams and a second aggregate transmission bandwidth for the second set of N concurrent data streams; comparing the first aggregate transmission bandwidth to the second aggregate transmission bandwidth; and responsive to a determination that the second aggregate transmission bandwidth is greater than the first aggregate transmission bandwidth by a first predetermined threshold, initiating a third set of Z concurrent data streams to transfer a portion of the large data file, wherein Z>N. In a preferred embodiment, responsive to a determination that the second aggregate transmission bandwidth is greater than the first aggregate transmission bandwidth by less than the first predetermined threshold and greater than a second predetermined threshold (within a threshold band), maintaining the N concurrent data streams, and responsive to a determination that the second aggregate transmission bandwidth is less than the first aggregate transmission bandwidth by the second predetermined threshold, initiating a third set of Z concurrent data streams to transfer a portion of the large data file, wherein Z<N. In a preferred embodiment, during continuous transfer of the large data file, the process further periodically determines an aggregate transmission bandwidth for a current set of concurrent data streams transferring a portion of the large data file, wherein the aggregate transmission bandwidth is a weighted average of aggregate transmission bandwidth measured for the current set of concurrent data streams with more recent measurements being given greater weight, and compares a latest aggregate transmission bandwidth with a previous aggregate transmission bandwidth. Responsive to a determination that the latest aggregate transmission bandwidth is different from the previous aggregate transmission bandwidth by a third predetermined threshold, a new set of concurrent data streams is initiated to transfer a portion of the large data file.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a diagram of a system for performing large data transfers over the Internet in accordance with a preferred embodiment of the present invention;

FIGS. 4A–4C are a high level flow chart for a process of transmitting large data files over a TCP/IP network such as the Internet in accordance with a preferred embodiment of the present invention.

DETAILED DESCRIPTION OF THE PREFERRED EMBODIMENT

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

Figure 1:
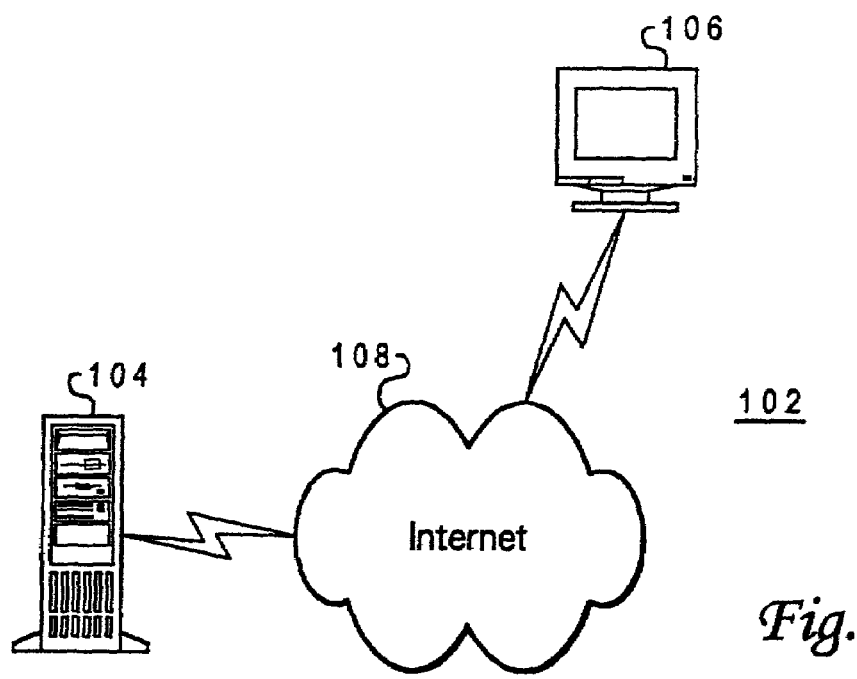
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 102 includes a server system 104 coupled to a client system 106 via the Internet 108. Data transfers between the server system 104 and client system 106 conform to the TCP/IP specification, as well as File Transfer Protocol (FTP), HyperText Transfer Protocol (HTTP), or some similar communications protocol. Large data transfers are performed in parallel segments as described in further detail below.

Referring to FIG. 2, a diagram of a system for performing large data transfers over the Internet in accordance with a preferred embodiment of the present invention is illustrated. A server application 204 executing within server system 104 receives a request for data 202 from client application 206 executing within client system 106. The data is transferred in segmented, parallel fashion as described below utilizing multiple data streams transmitting through a single, physical channel 208, such as wireless or optical fiber.

Clients downloading large files (more than 1 MB) may experience excessive transmission times caused at least in part by the sliding window limit utilized by TCP/IP. For example, a typical software product with 500 MB of data may require(500,000,000 Bytes/160,000 Byte/sec)=3125 sec=52 minutes for a typical transfer within the United States as earlier described. Moreover, a client with full T3 bandwidth (45 Mb/s) available is only capable of running at 1.28 Mb/s, or about 3% of the bandwidth of the T3 connection.

To improve bandwidth utilization, a large data file 202 which is to be transferred is segmented into segments 202a–202n (where "n" may be any integer). The file may be segmented in advance of any transfer request, or segmentation may occur as a result of a client TCP/IP transfer request, with the actual segmentation of the file being performed either prior to or concurrent with the transfer of the file. In response to the request, the server 204 begins normal transmission of the first segment 202a of data file 202. Server 204 may then measure round trip times for packets/acknowledgments during the first several seconds of the transfer (ping times may be utilized instead for simplicity) to determine the backbone limit B, calculates the average transmission bandwidth $T_{i-n}$ for the segment transfer (where n is the total number of data streams being employed for transfer at the time the evaluation is being made and i is the number of a particular data stream—i.e., $T_{1-1}$ for transmission of the first segment 202a alone) from the packet size(s) and transmission times (e.g., using byte counts and clock times), and compares the utilized transmission bandwidth $T_{1-1}$ to the ratio B given by the sliding window divided by the (average or mean) round trip time. Such transfer could be an upload or download.

If the transmission bandwidth $T_{1-1}$ utilized by the transfer of the first segment is close to the backbone limit ratio B (e.g., within some relative range such as a difference of 10–20% or less between $T_{1-1}$ and B), then server 204 immediately begins transferring the second segment 202b of the data file 202 in a logically distinct transfer process (but utilizing the same physical medium and communications path between server system 104 and client system 106). Round trip times for packet-acknowledgment pairs within both transfers and/or the ping time are measured and the individual transmission bandwidths $T_{i-n}$ ($T_{1-2}$ for the first segment 202a and $T_{2-2}$ for the second segment 202b) are calculated, together with the aggregate transmission bandwidth $T_{Total}$ for both transfers during the period of concurrent transmission (computed by summing the individual transmission bandwidths $T_{i-n}$).

In some of the embodiments, the individual transmission bandwidths $T_{i-n}$ may then be compared to the backbone limit B, and the aggregate transmission bandwidth $T_{Total-2}$ is compared to prior individual transmission bandwidth $T_{1-1}$ for transmission of the first segment 202a alone. If the individual transmission bandwidths $T_{1-2}$ and $T_{2-2}$ of each data stream are measured close to the backbone limit B, and if the aggregate transmission bandwidth $T_{Total-2}$ for both data streams is substantially greater than the initial individual transmission bandwidth $T_{1-1}$ for transmission of segment 202a alone, transmission of additional segments is initiated. If $T_N$ is the aggregate transmission bandwidth for N data streams and $T_M$ is the aggregate transmission bandwidth for M data streams, a determination of whether the aggregate transmission bandwidth for N data streams is sufficiently greater than the aggregate transmission bandwidth for M data streams to warrant adding additional data streams may be made from:

$$\frac{T_N - T_M}{T_M} > 0.15\left(\frac{N - M}{M}\right)$$

For example, where 2 data streams are increased to 4 data streams, the determination of whether the improvement in aggregate transmission bandwidth utilization was sufficiently improved to warrant starting two additional data streams would be made from the calculation:

$$\frac{T_2 - T_1}{T_1} > 0.15\left(\frac{2 - 1}{1}\right)$$

where $T_2$ is the aggregate transmission bandwidth for 4 data streams (i.e., $T_{Total-2}$) and $T_1$ is the aggregate transmission bandwidth for one data stream (i.e., $T_{1-1}$).

Once again the individual transmission bandwidths $T_{i-n}$ ($T_{1-4}$ for transfer of segment 202a, $T_{2-4}$ for transfer of segment 202b, $T_{3-4}$ for transfer of segment 202c, and $T_{3-4}$ for transfer of segment 202d) and aggregate transmission bandwidth $T_{Total-4}$ for the three concurrent transfers are calculated. If the individual transmission bandwidths $T_{i-n}$ are still measured close to the backbone limit B and the aggregate transmission bandwidth $T_{Total-4}$ exceeds the aggregate transmission bandwidth $T_{Total-2}$ for only two concurrent data streams by a sufficient amount, transmission of additional segments of data file 202 is initiated within a higher level logical data transfer with additional data streams. This process is repeated until either transfer of the last segment 202n of the full file 202 has been started or until adding additional data streams will not significantly increase the aggregate bandwidth $T_{Total-n}$ of all concurrent segment transfers. Within each data stream, when transfer of one segment is completed, transfer of another file segment is initiated within that data stream. All data streams which are started are utilized to transfer file segments until a data stream is deliberately terminated or no further file segments exist.

Alternatively, the addition of new data streams to the file transfer may be terminated based on a combination of the individual transmission bandwidths $T_{i-n}$ dropping below the backbone limit B to an unacceptable degree and the aggregate bandwidth $T_{Total-n}$ increasing less than a desired amount upon addition of the most recently started data stream. The particular criteria employed may vary depending upon the design.

Server application 204 transmits the selected number of segments concurrently to client application 206, which should be configured to receive large files in multiple segments utilizing logically distinct transmission processes over the same physical medium and communications path, then combine all segments to reconstruct the original large file 202. If the file 202 is divided into more segments 202a–202n than the number of distinct data streams which are employed for transmission, server application 204 will begin transfer of the next segment for which transfer has not already been initiated upon completing transfer of a previous segment. Client application 206 will typically receive the first segment 202a from server application 204 as a direct response to a request for data file 202, but may receive subsequent segments 202b–202n as a result of additional requests.

In accordance with a preferred embodiment of the present invention, the process performs a load balancing and dynamic control to provide the optimized session thread count at start-up and during transmission of the large data file. As used in the above example, if the client system 106 is capable of supporting a large thread count, then substantial performance impacts will result if client system 106 increments the thread count by only one as it seeks to find the maximum thread count for the data file transfer. In accordance with the preferred embodiment, an initial benchmark transmission is performed using a small number of segments, immediately followed a large number of segments transmitted within an equal number of threads, such as eight segments and threads. A short time window is used to compute the average bandwidth during these first two transmissions, and the difference between the aggregate bandwidths is computed.

In response to a request from client application 206 to transfer data 202, server application 204 begins normal transmission of the first segment 202a of data file 202. Client 206 then calculates the sustained transmission bandwidth $T_{i-n}$ for the segment transfer from the packet size(s) and transmission times. Server 204 immediately begins transferring eight segments over a second set of an equal number of concurrent data streams (202b–202i) of the data file 202 in a logically distinct transfer process (but utilizing the same physical medium and communications path between server system 104 and client system 106).

Round trip times for packet-acknowledgment pairs within both transfers and/or the ping time and the individual transmission bandwidths $T_{i-n}$ are measured. For each of the data streams of the second set of concurrent data streams ($T_{1-8}$ for the first segment 202a and $T_{8-8}$ for the eighth segment 202i), individual transmission bandwidths are calculated, together with the aggregate transmission bandwidth $T_{Total}$ for both transfers during the period of concurrent transmission (computed by summing the individual transmission bandwidths $T_{i-n}$). The data rates for the single or aggregate data streams are not measured instantaneously, but are continuously sampled over a period of time. The period of time may be adjusted to account for short term variations in the rate. A measurement is complete when the level of confidence in it's value reaches a predetermined threshold.

The individual transmission bandwidths $T_{i-n}$ are then compared to the backbone limit B, and the aggregate transmission bandwidth $T_{Total-8}$ is compared to prior individual transmission bandwidth $T_{1-1}$ for transmission of the first segment 202a alone. If the individual transmission bandwidths $T_{1-2}$–$T_{8-8}$ of each data stream are measured close to the backbone limit B, and if the aggregate transmission bandwidth $T_{Total-8}$ for both data streams is substantially greater than the initial individual transmission bandwidth $T_{1-1}$ for transmission of segment 202a alone, transmission of a third set of concurrent data streams is initiated to transfer a portion of the large data file, where the third set includes a greater number of data streams than was initiated for the second set. In this example, a third set of twelve concurrent data streams would be initiated. Initiation of the third set could be conducted by continuing transmission of the second set of eight concurrent data streams and initiating an additional four data streams to complete the twelve data streams. Alternatively, the second set of eight concurrent data streams could be terminated and a new set of twelve concurrent data streams could be initiated. If $T_N$ is the aggregate transmission bandwidth for N data streams and $T_M$ is the aggregate transmission bandwidth for M data streams, a determination of whether the aggregate transmission bandwidth for N data streams is sufficiently greater than the aggregate transmission bandwidth for M data streams to warrant increasing the number of data streams may be made from:

$$\frac{T_N - T_M}{T_M} > 0.15 \left( \frac{N - M}{M} \right)$$

For example, were 1 data stream has been increased to 8 data streams the system implementor may make the determination of whether the improvement in aggregate transmission bandwidth utilization was sufficiently improved to warrant starting a third set of data streams would be made from the calculation:

$$\frac{T_8 - T_1}{T_1} > 0.15 \left( \frac{8 - 1}{1} \right)$$

where $T_2$ is the aggregate transmission bandwidth for eight data streams (i.e., $T_{Total-2}$) and $T_1$ is the aggregate transmission bandwidth for one data stream (i.e., $T_{1-1}$).

If it is determined that the aggregate transmission bandwidth for the second set of eight concurrent data streams is not significantly greater than the initial individual transmission bandwidth $T_{1-1}$ for the transmission of segment 202a alone, then a third set of concurrent data streams is initiated having the optimal number of concurrent data streams fewer than N data streams is selected. For example, the third set could be initiated with one, two or four data streams, depending upon whether the individual transmission bandwidths $T_{i-n}$ are close the backbone limit ratio B, how close the aggregate transmission bandwidth $T_{Total-8}$ is to the aggregate transmission bandwidth $T_{Total-1}$, or other factors indicating transmission performance. In other words, responsive to a determination that the second aggregate transmission bandwidth is greater than the first aggregate transmission bandwidth by less than the first predetermined threshold and greater than a second predetermined threshold (within a threshold band), maintaining the N concurrent data streams, and responsive to a determination that the second aggregate transmission bandwidth is less than the first aggregate transmission bandwidth by the second predetermined threshold, initiating a third set of Z concurrent data streams to transfer a portion of the large data file, wherein Z<N.

In a preferred embodiment, the system selects the thread count from a predetermined schedule of thread counts comprising thread count steps that increase at ratios of 1.3×–1.5×—for thread counts above eight. For example, the thread count schedule may include the integer set defined by the union of [integer (2"), integer (1.5×2")] (i.e., 1, 2, 3, 4, 6, 8, 12, 16, 24, 32, 48, 64, . . . , or some near approximation of the sequence). This schedule of taking larger thread count steps at high thread counts and smaller steps at lower thread counts avoids the problem of small backbone bandwidth variations driving large swings in the thread count. The schedule of step increases in thread counts is always 33% or 50%, which in our experience is the smallest increment of thread count that can reliably optimize dynamic thread count. An increase in aggregate transmission bandwidth of at least a threshold amount of a 20% increase before the number of data streams is increased prevents the system from thrashing between multiple sets of thread counts.

The addition of each new data stream transferring a different segment as described produces diminishing returns in available bandwidth utilization. The data streams each compete with each other for a portion of the available bandwidth. As each transfer of a different segment within a new data stream is initiated, the individual transmission bandwidths $T_{i-n}$ may become significantly lower than the backbone limit B, at which time the initiation of any further data streams for the file transfer may optionally be terminated.

More significant, however, is the effect of each new data stream on the aggregate bandwidth $T_{Total-n}$ of all data streams. By tracking the impact of each new data stream on the aggregate bandwidth $T_{Total-n}$, a prediction may be made of whether adding another data stream is either unlikely to produce a significant increase in aggregate bandwidth or even likely to decrease the aggregate bandwidth. In either situation, initiation of other data streams to transfer file segments is terminated, allowing close to the maximum possible bandwidth utilization (aggregate bandwidth for concurrent data streams) to be achieved.

After the initial load balancing function is performed at start-up, the method and system of the preferred embodiment dynamically tracks performance of the data transfer and dynamically controls the thread count as conditions dictate to optimize aggregate transmission bandwidth. During continuous transfer of the data file, it is periodically determined what the aggregate transmission bandwidth is for the active set of M data streams currently transferring a portion of the large data file. This is followed by increasing the number of active data streams to N and again determining the aggregate data rate. If the aggregate transmission bandwidth $T_{Total-N}$ exceeds the aggregate transmission bandwidth $T_{Total-M}$, then a new set of concurrent data streams is initiated to transfer a portion of the large data file. The new set is selected from the thread count schedule described above. If the current aggregate transmission bandwidth is greater than the previous aggregate transmission bandwidth by a threshold amount, the set is selected at the next higher thread count in data stream counts. If the current aggregate transmission bandwidth is less than a threshold amount, a lower thread count step is taken to a lower number of data stream counts. In a preferred embodiment, threshold amount of at least 15% is required before a different thread count is taken. It will be appreciated that the threshold amount for incrementing the thread count may be a different percent threshold than that needed for a decrement of thread count. Threshold amounts of improvements in aggregate transmission bandwidth are required before the number of data streams is modified to avoid loading the server inappropriately during times of high utilization. This process continues throughout the entire transfer of the large data file to dynamically control the thread count to optimally utilize bandwidth. Within each data stream, when transfer of one segment is completed, transfer of another file segment is initiated within that data stream or the original stream is closed and a new one is opened. All data streams which are started are utilized to transfer file segments until a data stream is deliberately terminated or no further file segments exist.

In an alternative preferred embodiment of the present invention, the aggregate transmission bandwidth is calculated periodically for a current set of concurrent data streams by calculating a weighted average of the aggregate transmission bandwidth measured for the current set of concurrent data streams over a period T, with more recent measurements being given greater weight. One embodiment would use an exponential fading memory over period T of previous periodically calculated aggregate transmission bandwidths. This prevents long term fluctuations in the aggregate transmission bandwidth to introduce errors into the calculations that would occur if an overall running average was to be used. Moreover, the weighted average of aggregate transmission bandwidth could be tuned to filter out short term fluctuations in transmission bandwidth over the period T.

It will be appreciated that the load balancing function moves from a few threads to many threads during the initial benchmark transmissions. This minimizes the effect of bandwidth fluctuations in reaching the optimum thread count, and provides a method that more quickly arrives at the optimum thread count for high bandwidth clients. It has been found to be advantageous during the initializing phase at start-up to jump from the initial number of threads to a greater number of threads than the initial number plus one.

In alternative preferred embodiments of the present invention, the system uses hysteresis to prevent thrashing of thread counts due to short term fluctuations in bandwidth. Also, in alternative embodiments, a relative threshold or hurdle criteria could be used before increasing the thread count, such hurdle preventing small relative improvements in bandwidth from driving increases in thread count. Such relative criteria could be equivalent to a percent increase in achieving performance with fewer or more threads, or equivalent to an absolute change in achieved performance, either bandwidth or transmission time for fixed bite counts, with fewer or more threads. The selection of criteria could be dependent upon the actual transfer rate. For example, transfer rates above 10–100 Kb/s would use absolute change in achieved performance, while lower bandwidths would use a percent increased in achieved performance. In another preferred embodiment, the system may periodically perform a dithering function by arbitrarily increasing or decreasing the number of data streams calculate the new aggregate transmission bandwidth and then preform dynamic control of the threads as needed.

The preferred embodiment of the present invention balances server loads for multi-connection file transfers through a combination of algorithms operating on both server system 104 and client system 106. The server code operating within server application 204 tracks both the total thread count and the session (where a session is a file transfer with a single client comprising one or more data streams) thread count for the currently active data streams. A total thread limit is set statically for the server, based on performance. A session thread limit is adjusted dynamically in the server by balancing the trade-off between maximizing the possible number of concurrent sessions and maximizing the number of threads per session without significantly impacting server performance. The server code may communicate activity level to the concurrent clients running the concurrent sessions, wherein the client code within each client, including client application 206 within client server 106, will moderate its request for additional threads to help achieve an optimized aggregate transmission bandwidth among all clients. The client code within client application 206 provides a fixed connection limit. The fixed connection limit prevents the client from monopolizing network resources within the client infrastructure, for example if other users within the client campus need access to the Internet. The client code would continuously track performance to reoptimize thread count. For example, a "server busy" message from server system 104 to client system 106 would cause client 106 to delay requests to increase the thread count or to reduce the thread count. Moreover, connection reliability can also be considered when optimizing the session thread count. When a client loses connections to the server, the server may reduce the session thread count.

In an alternative preferred embodiment, the default maximum session thread count at the client can be reduced, prior to transfer the first data segment, if server system 104 is experiencing heavy loads. Moreover, server system 104 may refuse to connect session threads after the transfer has begun, and prior to its completion, may cause client system 106 to lower the maximum session thread count. Similarly, the server system 104 may communicate to the client 106 activity level of the network, which may then cause the client system 106 to lower the maximum session thread count.

Figure 3:
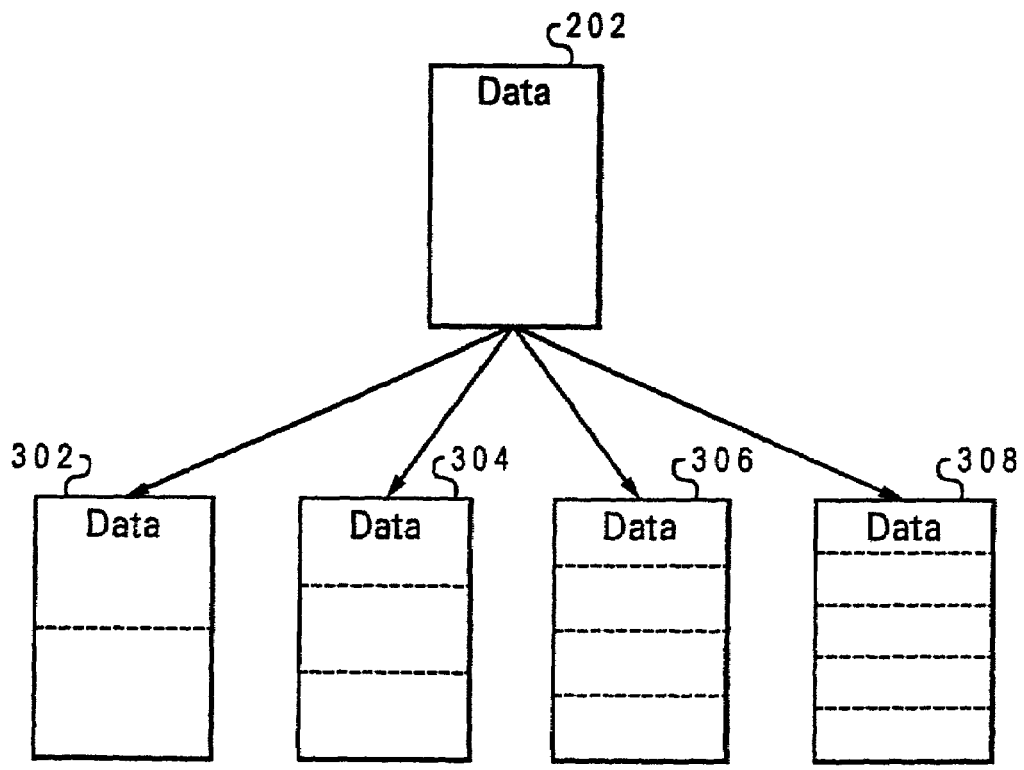
FIG. 3 depicts a diagram of segmentation of large data blocks for transmission in concurrent data streams over the Internet in accordance with a preferred embodiment of the present invention.

With reference now to FIG. 3, which is intended to be read in conjunction with the prior figures, a diagram of segmentation of large data blocks for transmission in concurrent data streams over the Internet in accordance with a preferred embodiment of the present invention is depicted. Large files are segmented, either by the transmitting server in response to a request or by a utility employed to upload the large files onto the server, into a number of pieces to support clients whose optimum number of data streams ranges from 1 and up. The segment sizes employed in dividing a data file 202 need not be equal.

For instance, segmenting a file into 3 pieces would enable only 1, 2 or 3 concurrent data streams to be employed during transmission, with clients optimized at 2 having to download the third segment individually, providing sub-optimal improvement of bandwidth utilization. Similarly dividing the file into 4 segments would be optimal for clients supporting 2 concurrent data streams, but not for clients supporting 3 data streams since the last segment would again be downloaded individually. Segmenting the file into 6 pieces, however, allows fully optimized downloads for any clients performing best with either 2 or 3 data streams; similarly, dividing the file into 12 segments would allow fully optimized download in any of 2, 3 or 4 data streams.

In general, a suitable number of segments may be determined from the maximum number n of concurrent data streams to be supported by calculating n!. For a client system supporting up to 5 concurrent data streams, for example, the file could be divided into 5!, or 120, segments. Such segmentation would support optimized downloads by 1, 2, 3, 4, 5, 6, 10, 12, 15, 20, 30, 40 or 60 simultaneous data streams.

The data file 202 may be logically divided, either in advance or upon receiving a request for the file, into a number of segments equaling the number of data streams optimally supported by the client. Multiple copies 302, 304, 306, and 308 of data file 202, each segmented into a different number of segments, may be maintained by server system 104. A preferred embodiment however is to use virtual segmentation of the file through the operating system seek function which allows a file to stay intact on the server or client and thereby segment the file by seeking to a segment boundary location and reading or writing a segment length of data. The appropriate copy 302, 304, 306, and 308 may then be selected for transmission in response to each specific request. However, the number of data streams employed should be fixed at the time transfer of data file 202 is initiated for such segmentation.

Referring back to FIG. 2, server application 204 and client application 206 cooperate in determining the number of data streams (and therefore the number of segments) which should be employed for the transfer of large data file 202. While server application 204 will generally seek to utilize the largest number of data streams providing the best available bandwidth utilization possible, segmentation of the file may constrain the number of data streams employed. For example, if data file 202 is segmented into only 12 portions, optimized for 2, 3, or 4 data streams, server application 204 would not start a fifth data stream despite any calculations predicting bandwidth utilization increases. Total transmission time would not be significantly improved under such circumstances, but network loading caused by the transmission would be increased for a portion of the transfer rather than generally equalized over the duration of the transfer.

Client application 206 may maintain bandwidth histories 208 between the client system 106 and the priority servers from which the client system 106 has recently downloaded large files. When returning to a server for which an historical performance was stored within bandwidth histories 208, the transmission of a large data file 202 may be started at 50–75% of the data stream count for prior transfers, then adding additional data streams (singly or, in an environment warranting a large number of streams such as T3 connections, in pairs or even more) while monitoring the impact on bandwidth utilization as described above.

Client application 206 may communicate either historical performance from bandwidth histories 208 or an identification of an initial number of data streams with each request to server application 204, allowing the data transfer to be initiated with multiple data streams as described above. Additionally, server system 104 may maintain performance or bandwidth histories for clients which receive recurring data transfers.

Since ping times and bandwidth availability may change during transmission of a large file (due to changes in traffic and/or network loading, for instance), downloads are continuously tracked and the number of data streams is adjusted, if necessary, over time. Each time a data stream completes transmission of a segment, the transmission of another segment within that data stream is delayed long enough to determine whether the aggregate bandwidth $T_{Total-n-1}$ of the remaining data streams rises to roughly the aggregate bandwidth $T_{Total-n}$ of all data streams prior to completion of transfer for the just-completed segment. If so, the data stream which just completed transfer of a segment may be halted, depending on the number of file segments remaining; if not, transmission of another segment on the data stream is initiated or one is stopped and another started. The determination may be made utilizing the same formula given above for deciding whether to add an additional data stream. As a practical matter, however, dynamic changes to the number of data streams after transfer of the first few file segments has been initiated (i.e., after some initial optimal number of data streams has been determined and started) will only be useful for a large and/or highly segmented data file.

If the number of file segments remaining to be transferred would negate any benefit to halting a data stream, transfer of another segment over the data stream which just completed transfer of a previous segment may be initiated despite any rise in the aggregate bandwidth of the remaining data streams. For example, if three data streams had been utilized and nine (out of twelve) file segments remained to be transferred, the client or server application might continue to utilize three data streams until only six file segments remained before reducing the number of data streams to two.

Figure 4A:
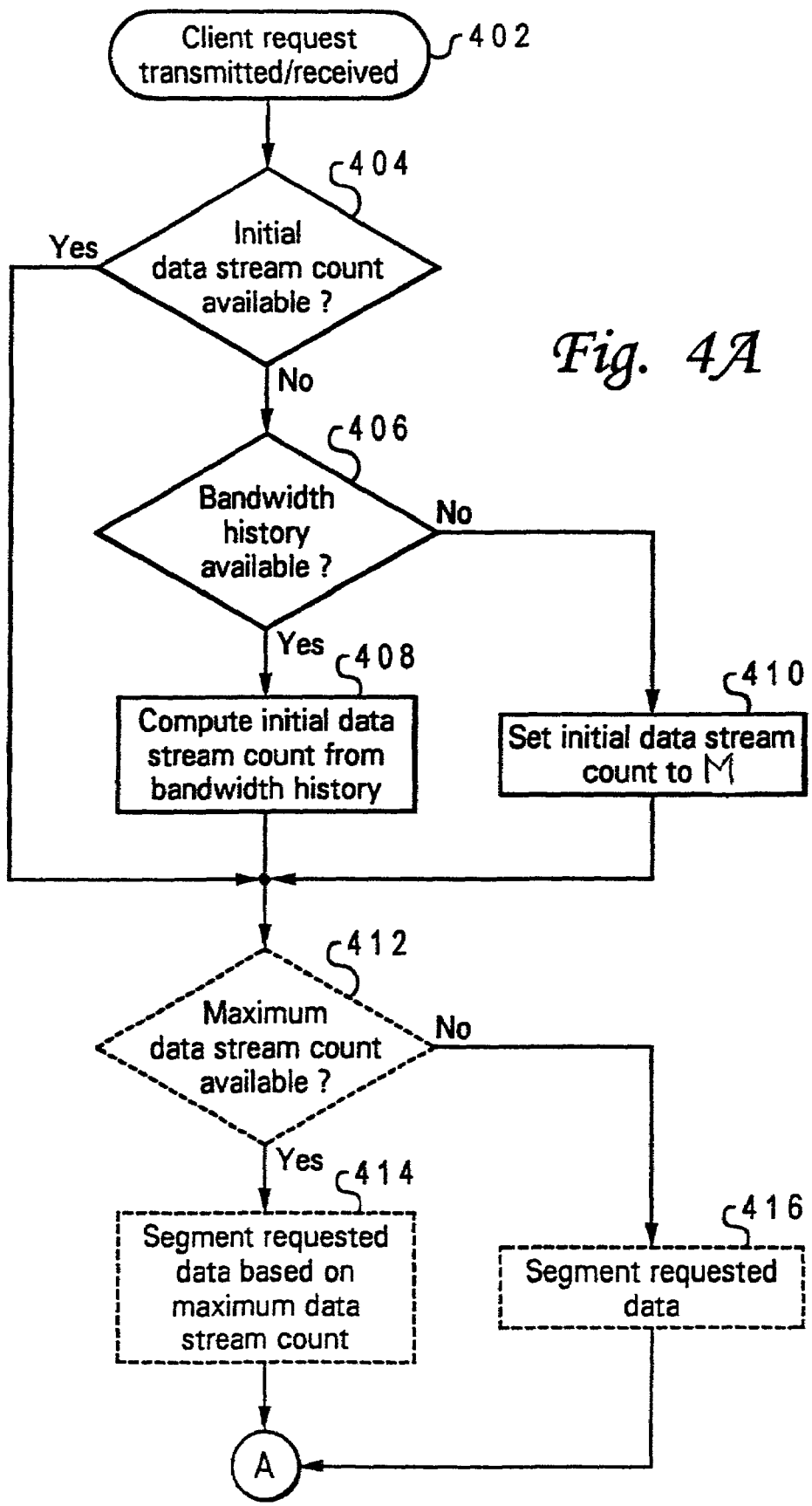
Figure 4B:
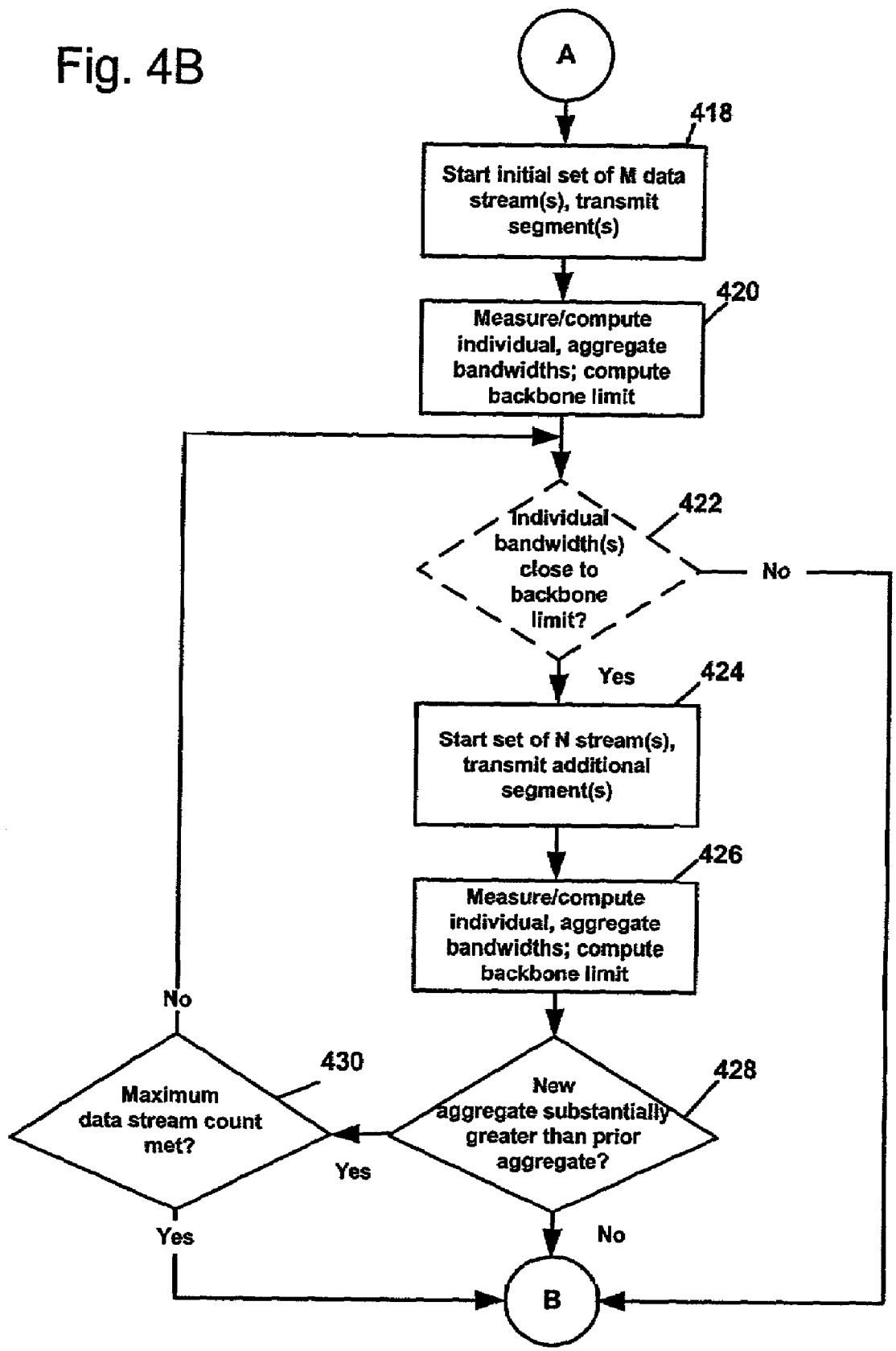

Referring to FIGS. 4A through 4C, a high level flow chart for a process of transmitting large data files over a TCP/IP network such as the Internet in accordance with a preferred embodiment of the present invention is illustrated. The process begins at step 402, which depicts a client request for a large file (greater than 1 MB) being transmitted and received. The client request may include a bandwidth performance history for previous downloads between the subject client-server pair, or a number of initial data streams to be employed. The client request may also include a maximum data stream count supported by the client for concurrent data streams (e.g., a historical maximum for downloads from any server, a number of processors or network adapters, or simply some setting within the client application for maximum data stream count).

The process first proceeds to step 404, which illustrates a determination of whether an initial data stream count is available, either from the client or the server. If so, the process skips to optional step 412, described below. If not, however, the process proceeds to step 406, which depicts a determination of whether bandwidth performance history—either in general for the client, in general for the server, or for the subject client-server pair—is available (from either the client or server). If bandwidth performance history is available, the process proceeds to step 408, which illustrates computing an initial data stream count from the bandwidth history. If no initial data stream count and no bandwidth history is available, however, the process proceeds instead to step 410, which depicts setting the initial data stream count to M, where M is equal to one or more.

The process next passes to optional step 412, which illustrates a determination of whether a maximum data stream count is available (either from the client or the server). Maximum data stream counts may be specified for either the client or the server based on a number of processors or network adapters available within the respective system or based on other criteria. If a maximum data stream count is available, the process may proceed to step 414, which depicts segmenting the requested data file based on the maximum data stream count. If no maximum data stream count is available, the process proceeds instead to step 416, which illustrates segmenting the requested data file. If no maximum data stream count is specified for either the client or server, the file is segmented utilizing a predicted maximum data stream count in the manner described above.

Steps 414 and 416 are optional in that the requested data file may have been previously segmented. If no maximum data stream count is supported by a particular implementation, the process may proceed from steps 408 or 410 directly to step 416. In the exemplary embodiment, the process proceeds from steps 414 or 416, or from step 412 if the requested data was previously segmented, to step 418, which illustrates starting a number of data streams equal to the initial data stream count and transmitting a different segment of the requested data file over each data stream. The process then passes to step 420, which depicts measuring ping times and transmission rates and computing individual and aggregate bandwidths, together, optionally, with the backbone limit.

In a preferred embodiment, the process passes next to step 422, which illustrates a determination of whether the individual bandwidth(s) for the active data streams are close to the backbone limit, indicating that the backbone bandwidth is limiting available bandwidth utilization as a result of the sliding window and round trip times (this decision block is shown in dashed lines to indicate that it is an optionally step in the process). If so, the process proceeds to step 424, which depicts initiation of an additional seven data streams and transmission of the additional segments of the requested data file, then to step 426, which illustrates once again measuring ping times and transmission rates, and computing individual and aggregate bandwidths and the backbone limit. If step 422 shows that the individual bandwidths are not close the backbone limit, the process proceeds to step 434.

From step 426, the process passes to step 428, which depicts a determination of whether the aggregate bandwidth, with the additional data streams started in step 424, is substantially greater than the prior aggregate bandwidth for the M data streams. If so, the process proceeds to step 430, which illustrates a determination of whether the maximum data stream count is met. A maximum data stream count may be imposed to prevent "pigging" of available bandwidth by a recipient and resultant problems within the server system or network. The maximum data stream count may be implemented in an adjustable manner, but preferably require detailed familiarity with the process for alteration. If the maximum data stream count is not met, the process returns to step 422 to repeat the determination regarding individual bandwidths and the backbone limit. Alternatively, the process might instead return to step 424 and simply start additional data streams. In the preferred embodiment, however, the individual transmission bandwidths are compared to the backbone limit before any additional data streams are started.

If the individual transmission bandwidths are not close to the backbone limit (step 422), or if the aggregate bandwidth with the additional data streams are not substantially greater than the aggregate bandwidth without the additional data streams (step 428), or if the maximum data stream count has been met (step 430), the process proceeds to step 434, which depicts the step of continuously measuring and computing the individual and aggregate bandwidths of the current threads. The process then proceeds to step 435, where a determination is made whether the current aggregate is substantially different than the previous aggregates using a weighted average statistic, weighing recent statistics more heavily than those of past statistics. If the current aggregate is substantially different than the prior aggregates, the process proceeds to step 436, where a new set of data streams is initiated, the number of data streams in the new set being selected to adjust for the difference found in step 435. Thereafter, the process returns to step 434.

If the current aggregate is not substantially different than prior aggregates using a weighted average statistic, or if a segment has completed transmission, the process proceeds to step 437, where a determination is made whether additional segments will be transmitted. If so, the process proceeds to step 438, which depicts the step of pausing the data stream that just completed transfer of a data segment, then measuring and computing the aggregate bandwidth of the remaining data streams. The process then passes to step 439, which illustrates a determination of whether the aggregate bandwidth for the remaining data streams (other than the paused data stream) approaches the aggregate bandwidth of all data streams before the recent completion of a segment. If not, the process then proceeds to step 440, which depicts restarting the paused data stream and transmitting another file segment. From step 440, or from step 439 if the aggregate bandwidth of the data streams excluding the paused data stream does approach the prior aggregate bandwidth, the process passes back to step 434.

Referring back to step 437, once no additional segments remain to be transmitted, the process passes to step 442, which depicts a determination of whether transfer of all segments has completed. If not, the process continues polling until completion of all segments. Upon completion of all segments, the process proceeds to step 444, which illustrates assembling the segments on the client side (or server side if an upload) to reproduce the requested content. Segment identifiers may be included in the transmitted segment for this purpose. Additionally, error checks such as a CRC and/or other validation methods may be utilized to test the transmitted data. The process then passes to step 446, which depicts the process becoming idle until another large file is requested.

The present invention enables automated concurrent upload or download of a large file in segments over the Internet or similar communications systems employing TCP/IP, with the file being reconstructed from the segments at the receiving end. The client and server jointly and efficiently initiate the transfer with the optimum thread count. During continuous data transfer, performance is periodically tracked and the number of concurrent data streams and/or the number of segments employed is dynamically controlled in order to optimize the overall transfer time. The number of data streams employed is constrained to the lesser of the number of data streams which provides the best available bandwidth utilization possible or the maximum number of data streams for which the segmentation of the file is optimized.

In the present invention, overall transfer time is optimized utilizing network performance measures including ping time, current bandwidth measurements, recent transmission histories, current server loading (utilization), client loading, or some subset of these measures to determine the number of concurrent data streams which should be employed. The decision process may utilize fuzzy logic, artificial intelligence, or an expert system to process the data in setting the number of data streams. Bandwidth performance histories for file transfers between client-server pairs may be maintained and employed for selecting an initial number of data streams. File uploads and downloads may have different histories.

Identification, authentication, message integrity verification, and optional privacy/encryption features may be integrated into the bandwidth optimization and data stream control of the present invention. Similarly, purchase, registration, configuration, public key request, and other communications or business processes may be also integrated. For transfers from multiprocessor systems, the multiple threads for each data stream may be individually assigned and possibly pinned to distinct processors to improve overall performance. Independent of whether the system is a multiprocessor system, the multiple threads may also be associated with separate network adapters within either the client or server system to improve transfer performance.

Although described in the context of client-server systems above, the present invention may also be utilized in peer-to-peer transfers of large data files. Moreover, the present invention may be employed for data transfers over any TCP/IP network, not just the Internet.

Previous proposals for improving bandwidth, such as parallel FTP and parallel HTTP, are client-side solutions. Parallel FTP is a client-only solution which seeks to improve transfer bandwidth by creating multiple, parallel FTP clients all communicating with the same server. However, the FTP server code is not altered in any way so that it can continue to conform to the standard. Additionally, all of the intelligence is restricted to the client, with the client deciding whether to employ download parallelism.

Parallel HTTP has only been implemented in a limited fashion. Commercially available browsers may create multiple concurrent but independent HTTP sessions when downloading a Web page with multiple graphic images. To speed up page transfer, the browser will create multiple separate HTTP sessions, each downloading a unique separate file. However, segmentation of a single large file and parallel retrieval of the portions is not supported.

The present invention differs from parallel FTP and parallel HTTP in that the logic which drives parallelism is embedded within the server as well as the client. With the present invention, the client need only be configured to reconstruct file segments. Either the client or the server side of the session is modified (unlike parallel FTP or parallel HTTP) and controls the decision regarding how many concurrent data streams are started and when they are terminated. No theoretical limit on the number of concurrent data streams is set in the present invention, and the implementation is independent of the file transfer system with no inherent dependencies of FTP, HTTP, or any other protocol other than TCP/IP.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of transmitting data, comprising:
   initiating transfer of a large data file containing a plurality of segments over a network by transmitting one or more segments of the plurality of segments utilizing a first set of M concurrent data streams, wherein M is one or more, followed by transmitting one or more segments of the plurality of segments utilizing a second set of N concurrent data streams, wherein N>M+1;
   during transmission utilizing the first set of M concurrent data streams, determining individual transmission bandwidths for each concurrent data stream of the first set of M concurrent data streams and a first aggregate transmission bandwidth for the first set of M concurrent data streams;

during transmission utilizing the second set of N concurrent data streams, determining individual transmission bandwidths for each concurrent data stream of the second set of N concurrent data streams and a second aggregate transmission bandwidth for the second set of N concurrent data streams;

comparing the first aggregate transmission bandwidth to the second aggregate transmission bandwidth; and responsive to a determination that the second aggregate transmission bandwidth is greater than the first aggregate transmission bandwidth by a first predetermined threshold, initiating a third set of Z concurrent data streams to transfer a portion of the large data file, wherein $Z>N$.

2. The method of claim 1, further comprising the step of:
responsive to a determination that the second aggregate transmission bandwidth is greater than the first aggregate transmission bandwidth by less than a second predetermined threshold, initiating the third set of Z concurrent data streams to transfer a portion of the large data file, wherein $Z<N$.

3. The method of claim 1, wherein Z is selected from a predetermined schedule of numbers that are separated by a relative ratio of greater than 120%.

4. The method of claim 1, wherein the step of determining individual transmission bandwidths for each concurrent data stream of the first and second set of concurrent data streams and the aggregate transmission bandwidths for the first and second set of concurrent data streams further comprises:
computing the individual transmission bandwidths from byte counts and clock times; and
computing the aggregate transmission bandwidth by summing the individual transmission bandwidths.

5. The method of claim 1, further comprising:
during continuous transfer of the large data file, periodically determining an aggregate transmission bandwidth for a current set of concurrent data streams transferring a portion of the large data file;
comparing a latest aggregate transmission bandwidth with a previous aggregate transmission bandwidth; and
responsive to a determination that the latest aggregate transmission bandwidth is different from the previous aggregate transmission bandwidth by a third predetermined threshold, initiating a new set of concurrent data streams to transfer a portion of the large data file.

6. The method of claim 5, wherein the aggregate transmission bandwidth is a weighted average of all measurements of aggregate transmission bandwidth for the current set of concurrent data streams, with more recent measurements being given greater weight.

7. The method of claim 1, further comprising:
(a) determining whether the individual transmission bandwidths for an active set of concurrent data streams are close to a backbone limit;
(b) determining whether an aggregate transmission bandwidth for the active set of concurrent data streams is greater than an aggregate transmission bandwidth for a previous set of concurrent data streams by the first predetermined threshold; and
(c) responsive to an affirmative determination in steps (a) and (b), initiating a new set of concurrent data streams to transfer a portion of the large data file.

8. The method of claim 7, further comprising:
determining a specified maximum data stream count from either a system originating the large data file or a system receiving the large data file; and
repeating steps (a) through (c) until either the aggregate transmission bandwidth for the active set of concurrent data streams is not substantially greater than the aggregate bandwidth for all of the prior number of active data streams or the maximum data stream count is reached.

9. The method of claim 8, wherein the maximum data stream count is reduced by a system receiving the active set of concurrent data streams responsive to the aggregate transmission bandwidth for the active set of concurrent data streams.

10. The method of claim 1, further comprising the step of:
responsive to a determination that the second aggregate transmission bandwidth is approximately equal to the first aggregate transmission bandwidth within a threshold band, initiating the third set of Z concurrent data streams to transfer a portion of the large data file, wherein $Z=N$.

11. A system for transmitting data, comprising:
an originating system;
a receiving system;
a TCP/IP network coupling the originating system and the receiving system;
a first set of M concurrent data streams between the originating system and the receiving system on the network, each transmitting one or more segments of a plurality of segments of a large data file, wherein M is one or more, followed by transmitting one or more segments of the plurality of segments utilizing a second set of N concurrent data streams, wherein $N>M+1$;
logic within either the originating system or the receiving system for, during transmission utilizing the first set of M concurrent data streams, determining individual transmission bandwidths for each concurrent data stream of the first set of M concurrent data streams and a first aggregate transmission bandwidth for the first set of M concurrent data streams;
logic within either the originating system or the receiving system for, during transmission utilizing the second set of N concurrent data streams, determining individual transmission bandwidths for each concurrent data stream of the second set of N concurrent data streams and a second aggregate transmission bandwidth for the second set of N concurrent data streams;
logic within either the originating system or the receiving system for comparing the first aggregate transmission bandwidth to the second aggregate transmission bandwidth; and
logic within either the originating system or the receiving system responsive to a determination that the second aggregate transmission bandwidth is greater than the first aggregate transmission bandwidth by a first predetermined threshold by initiating a third set of Z concurrent data streams to transfer a portion of the large data file, wherein $Z>N$.

12. The system of claim 11, wherein Z is selected from a predetermined schedule of numbers that are separated by a relative ratio of greater than 120%.

13. The system of claim 11, further comprising:
logic within either the originating system or the receiving system for, during continuous transfer of the large data file, periodically determining an aggregate transmission bandwidth for a current set of concurrent data streams transferring a portion of the large data file;

logic within either the originating system or the receiving system for comparing a latest aggregate transmission bandwidth with a previous aggregate transmission bandwidth; and logic within either the originating system or the receiving system responsive to a determination that the latest aggregate transmission bandwidth is different from the previous aggregate transmission bandwidth by a third predetermined threshold by initiating a new set of concurrent data streams to transfer a portion of the large data file.

14. The system of claim 13, wherein the aggregate transmission bandwidth is a weighted average of all measurements of aggregate transmission bandwidth for the current set of concurrent data streams, with more recent measurements being given greater weight.

15. The system of claim 11, further comprising logic within either the originating system or the receiving system for:
(a) determining whether the individual transmission bandwidths for an active set of concurrent data streams are close to a backbone limit;
(b) determining whether an aggregate transmission bandwidth for the active set of concurrent data streams is greater than an aggregate transmission bandwidth for a previous set of concurrent data streams by the first predetermined threshold; and
(c) responsive to an affirmative determination in steps (a) and (b), initiating a new set of concurrent data streams to transfer a portion of the large data file.

16. The system of claim 15, further comprising logic within either the originating system or the receiving system for:
determining a specified maximum data stream count from either a system originating the large data file or a system receiving the large data file; and
repeating steps (a) through (c) until either the aggregate transmission bandwidth for the active set of concurrent data streams is not substantially greater than the aggregate bandwidth for all of the prior number of active data streams or the maximum data stream count is reached.

17. The system of claim 16, wherein the maximum data stream count is reduced by a system receiving the active set of concurrent data streams responsive to the aggregate transmission bandwidth for the active set of concurrent data streams.

18. The system of claim 11, further comprising logic within either the originating system or the receiving system responsive to a determination that the second aggregate transmission bandwidth is approximately equal to the first aggregate transmission bandwidth within a threshold band, initiating the third set of Z concurrent data streams to transfer a portion of the large data file, wherein Z=N.

19. An article of manufacture for use in transmitting data, the article of manufacture comprising computer readable storage media including program logic embedded therein that causes control circuitry to perform the steps of:
initiating transfer of a large data file containing a plurality of segments over a network by transmitting one or more segments of the plurality of segments utilizing a first set of M concurrent data streams, wherein M is one or more, followed by transmitting one or more segments of the plurality of segments utilizing a second set of N concurrent data streams, wherein N>M+1;
during transmission utilizing the first set of M concurrent data streams, determining individual transmission bandwidths for each concurrent data stream of the first set of M concurrent data streams and a first aggregate transmission bandwidth for the first set of M concurrent data streams;
during transmission utilizing the second set of N concurrent data streams, determining individual transmission bandwidths for each concurrent data stream of the second set of N concurrent data streams and a second aggregate transmission bandwidth for the second set of N concurrent data streams;
comparing the first aggregate transmission bandwidth to the second aggregate transmission bandwidth; and
responsive to a determination that the second aggregate transmission bandwidth is greater than the first aggregate transmission bandwidth by a first predetermined threshold, initiating a third set of Z concurrent data streams to transfer a portion of the large data file, wherein Z>N.

20. The article of manufacture according to claim 19, further comprising the step of:
responsive to a determination that the second aggregate transmission bandwidth is greater than the first aggregate transmission bandwidth by less than a second predetermined threshold, initiating the third set of Z concurrent data streams to transfer a portion of the large data file, wherein Z<N.

21. The article of manufacture according to claim 19, further comprising the step of:
responsive to a determination that the second aggregate transmission bandwidth is approximately equal to the first aggregate transmission bandwidth within a threshold band, initiating the third set of Z concurrent data streams to transfer a portion of the large data file, wherein Z=N.

22. The article of manufacture according to claim 19, wherein Z is selected from a predetermined schedule of numbers that are separated by a relative ratio of greater than 120%.

23. The article of manufacture according to claim 19, wherein the step of determining individual transmission bandwidths for each concurrent data stream of the first and second set of concurrent data streams and the aggregate transmission bandwidths for the first and second set of concurrent data streams further comprises:
computing the individual transmission bandwidths from byte counts and clock times; and
computing the aggregate transmission bandwidth by summing the individual transmission bandwidths.

24. The article of manufacture according to claim 19, the steps further comprising:
during continuous transfer of the large data file, periodically determining an aggregate transmission bandwidth for a current set of concurrent data streams transferring a portion of the large data file;
comparing a latest aggregate transmission bandwidth with a previous aggregate transmission bandwidth; and
responsive to a determination that the latest aggregate transmission bandwidth is different from the previous aggregate transmission bandwidth by a third predetermined threshold, initiating a new set of concurrent data streams to transfer a portion of the large data file.

25. The article of manufacture according to claim 24, wherein the aggregate transmission bandwidth is a weighted average of all measurements of aggregate transmission bandwidth for the current set of concurrent data streams, with more recent measurements being given greater weight.

26. The article of manufacture according to claim 19, the steps further comprising:
(a) determining whether the individual transmission bandwidths for an active set of concurrent data streams are close to a backbone limit;
(b) determining whether an aggregate transmission bandwidth for the active set of concurrent data streams is greater than an aggregate transmission bandwidth for a previous set of concurrent data streams by the first predetermined threshold; and
(c) responsive to an affirmative determination in steps (a) and (b), initiating a new set of concurrent data streams to transfer a portion of the large data file.

27. The article of manufacture according to claim 26, the steps further comprising:
determining a specified maximum data stream count from either a system originating the large data file or a system receiving the large data file; and
repeating steps (a) through (c) until either the aggregate transmission bandwidth for the active set of concurrent data streams is not substantially greater than the aggregate bandwidth for all of the prior number of active data streams or the maximum data stream count is reached.

* * * * *